US006626153B2

(12) United States Patent
Hirano et al.

(10) Patent No.: US 6,626,153 B2
(45) Date of Patent: Sep. 30, 2003

(54) FUEL INJECTION ENGINE

(75) Inventors: Micho Hirano, Akashi (JP); Takemi Inoue, Kakogawa (JP); Tetsuaki Shirai, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/157,868

(22) Filed: May 31, 2002

(65) Prior Publication Data
US 2002/0179058 A1 Dec. 5, 2002

(30) Foreign Application Priority Data
Jun. 1, 2001 (JP) ........................................ 2001-166637

(51) Int. Cl.[7] .............................................. F02D 41/00
(52) U.S. Cl. ...................................... 123/475; 123/480
(58) Field of Search ................................ 123/475, 478, 123/480

(56) References Cited

U.S. PATENT DOCUMENTS

| | | | | |
|---|---|---|---|---|
| 4,058,709 A | * | 11/1977 | Long | ........................ 123/475 X |
| 4,180,023 A | * | 12/1979 | Kobayashi et al. | .......... 123/478 |
| 4,653,450 A | * | 3/1987 | Arnold et al. | ........... 123/475 X |

* cited by examiner

*Primary Examiner*—Tony M. Argenbright
(74) *Attorney, Agent, or Firm*—Oliff & Berridge, PLC

(57) ABSTRACT

Provided a fuel injection industrial engine E capable of determining a fuel injection quantity and an injection timing by a simple structure. The engine E includes a fuel injector 6 for injecting a fuel into intake air; ignition coils 31 and 32 for activating ignition plugs by generating an ignition signal synchronized with the rotation of the engine E; and an injection control device 5 for controlling the injection quantity and the injection timing of the fuel injector 6 by determining the engine speed (or the rotating speed) and phase on the basis of an ignition current signal e extracted from a primary side of said ignition coils 31 and 32.

11 Claims, 4 Drawing Sheets

31, 32 : IGNITION COIL
41, 42 : IGNITION PLUG
e : IGNITION CURRENT SIGNAL 31, 32 : IGNITION COIL
41, 42 : IGNITION PLUG
e : IGNITION CURRENT SIGNAL

FUEL INJECTION ENGINE

BACKGROUND OF THE INVENTION

1. Field of Invention

The present invention relates to a fuel injection control of a fuel injection engine and, more particularly, a fuel injection type general-purpose engine capable of setting a fuel injection quantity and an injection timing with a simple structure.

2. Description of Related Art

In general, general-purpose engines adopt a carburetor in a fuel system, and the so-called "magnet ignition system" in the ignition system in order to suppress the manufacturing cost of the engine.

The magnet ignition system includes: a flywheel mounted on the crankshaft of the engine; a magnet disposed on the flywheel; and an ignition coil. The ignition is effected by the high voltage which is induced in the ignition coil by the magnet.

However, in the case that a carburetor type engine is changed into a fuel injection engine which is superior in startability, operability just after start and exhaust gas emission, newly added parts and complicated structures are needed.

In order to determine the fuel injection quantity and the injection timing of the fuel injection engine, it is necessary to discriminate the speed (the rotating speed) and the phase of the engine. As this discrimination means, there are usually used a pulsar coil and a rotary disc having a number of protrusions on its outer circumference. In the fuel injection type, therefore, in addition to the ignition coil, there are newly needed parts such as the pulsar coil and the rotary disc, inviting a complicated structure and increased cost.

SUMMARY OF THE INVENTION

Accordingly, it is an object of the present invention to provide a fuel injection engine which can make simple and inexpensive means for determining a fuel injection quantity and an injection timing.

According to the first aspect of the present invention, a fuel injection engine comprises: a fuel injector for injecting a fuel into intake air; an ignition coil for activating an ignition plug by generating an ignition current synchronized with the rotation of the engine; and an injection control device for controlling the injection quantity and the injection timing of the fuel injector, wherein the injection control device determines the engine speed and phase by using an ignition current extracted from a primary coil side of the ignition coil to control the injection quantity and the injection timing of the fuel injector.

According to the fuel injection engine, the ignition current from the ignition coil can be used as the timing signal to control the injection quantity and the injection timing of the fuel injector. Therefore, the pulsar coil and the rotary disc, as have been essential for the fuel injection engine of the prior art, can be dispensed with to reduce the number of parts and to lower the manufacturing cost.

Preferably, the engine is a V-type 2-cylinder engine, and the ignition coil is provided for each cylinder. Thus, the timing signals of unequal pitches out of phase shifts of 90 degrees and 270 degrees are obtained from the ignition coils which are provided for the V-type 2-cylinder engine having a bank angle of 90 degrees, for example. By using these unequal pitch signals, therefore, the cylinder can be discriminated without any other discrimination circuit so that the injection quantity and the injection timing of the fuel injector can be controlled independently for any of the cylinders.

Preferably, the injection control device is using a microcomputer.

Preferably, the fuel injection engine further comprises: a flywheel mounted on a crankshaft; and a magnet disposed on the rotary face of the flywheel, wherein the ignition coils having a predetermined clearance from the magnet are disposed to be circumferentially spaced by a predetermined angle on the engine.

Preferably, the magnet is disposed on the outer circumference of the flywheel, and the ignition coils disposed outside of the flywheel have a core, and the core has a predetermined clearance from the magnet.

BRIEF DESCRIPTION OF THE DRAWINGS

The invention will be described with reference to the following drawings, wherein.

DETAILED DESCRIPTION OF PREFERRED EMBODIMENTS

Figure 1:
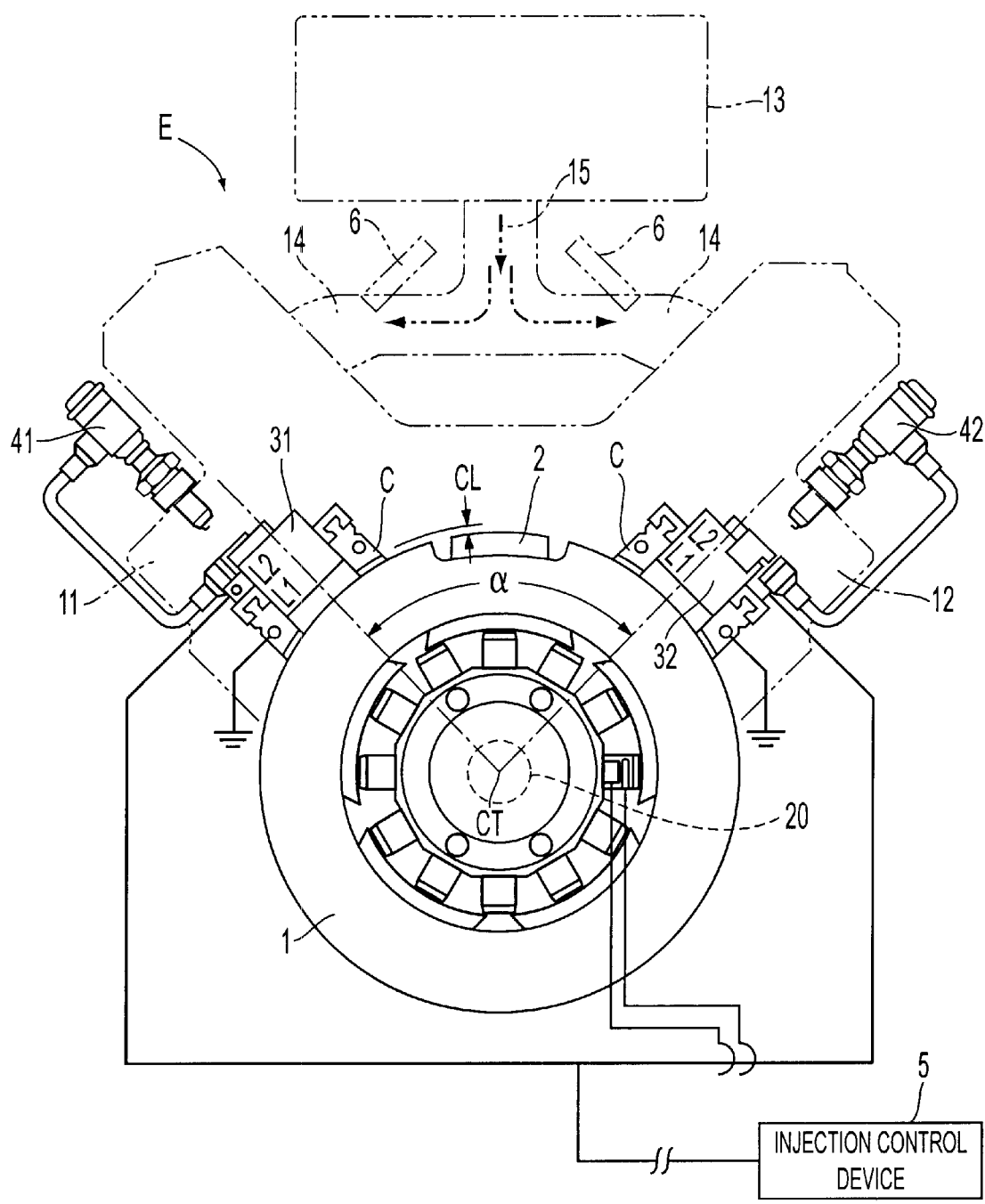
FIG. 1 is a front elevation schematically showing a fuel injection engine according to an embodiment of the present invention.

A fuel injection engine according to an embodiment of the present invention will be described with reference to FIG. 1 to FIG. 4. In FIG. 1, an engine E is a small-sized, general-purpose V-type 2-cylinder 4-cycle engine to be employed as a drive source for an agricultural machine, an industrial machine or the like. The engine E is provided with first and second cylinders 11 and 12 which are arranged in a V-shape on the axis CT of a crankshaft 20. In this embodiment, the two cylinders 11 and 12 have a bank angle α set to 90 degrees, considering the problem of vibrations. Intake air 15 is sucked from an air cleaner 13 via an intake passage 14 into the two cylinders 11 and 12. The intake passage 14 is provided with a fuel injector 6 for each of the cylinders 11 and 12. The fuel is injected from the fuel injectors 6 into the intake air 15 flowing in the intake passages so that air-fuel mixtures are produced.

Figure 2:
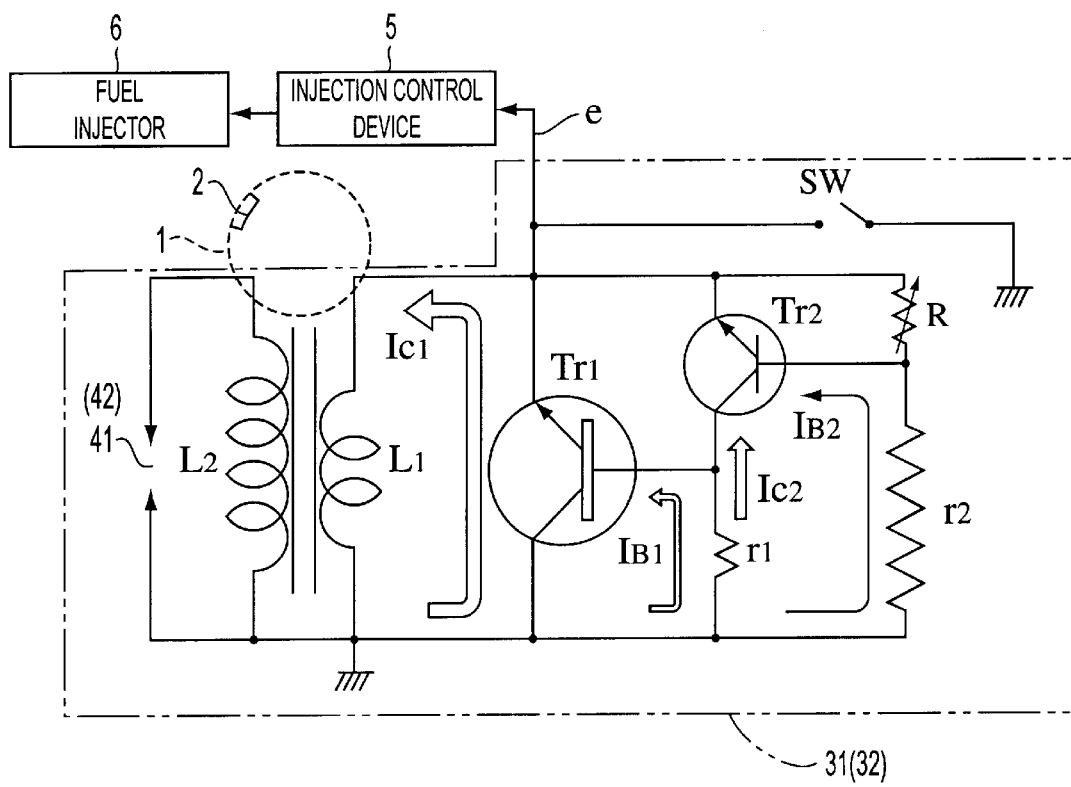
FIG. 2 is an ignition coil diagram in the engine.

A magnet 2 is disposed at a predetermined position of the outer circumference of a flywheel 1 which is mounted on the crankshaft 20. A first lefthand ignition coil 31 and a second righthand ignition coil 32 are arranged at positions to confront the outer circumference of the magnet 2 with a predetermined clearance CL and are circumferentially spaced by the predetermined bank angle α. A first ignition plug 41 is connected with the first ignition coil 31, and a second ignition plug 42 is connected with the second ignition coil 32. Each of these first and second ignition coils 31 and 32 is provided with a U-shaped core C, a primary coil L1 and a secondary coil L2. As shown in FIG. 2, an ignition current signal e extracted from the primary coil side is inputted as a timing signal to an injection control device 5 so that the injection quantity and the injection timing of the fuel can be computed.

The ignition coils 31 and 32 are based on the current interrupting method, in which a high voltage is generated on the secondary coil side L2 by interrupting a primary current in the primary coil side L1 induced by the rotation of the flywheel 1, and act as will be described in the following.

1) As the magnet 2 is moved by the rotation of the flywheel 1, a voltage is generated in the primary side coil L1 so that a base current IB1 flows at first to a power transistor Tr1. An amplified collector current Ic1 flows through the ON power transistor Tr1 to form a primary circuit.

2) As the flywheel 1 further rotates, the voltage to be generated at the primary side coil L1 rises to reach the ignition timing position. At this timing, the generated voltage exceeds a resistor (i.e., a resistor for regulating the base current of Tr2) r2 so that a base current IB2 begins to flow to a drive transistor Tr2. Simultaneously with the flow of IB2, the Tr2 is turned ON so that a collector current Ic2 flows.

3) Since the internal resistance of the drive transistor Tr2 is far lower than that of the power transistor Tr1, however, the IB1 having been flowing through the Tr1 until then turns wholly into the Ic2 to flow through the Tr2.

4) Thus, the base current IB1 instantly stops flowing to the power transistor Tr1 so that the large current Ic1 having been flowing through the primary coil L1 until then is abruptly interrupted.

5) As a result of this abrupt current change of the primary circuit, a high voltage is generated in the secondary coil L2 so that a spark is generated at the ignition plug 41 (42) to ignite the fuel mixture. Here, reference character r1 designates a base current regulating resistor for the Tr1.

In the fuel injection engine, the injection control device 5 is connected with the primary coil sides of the ignition coils 31 and 32, and the engine speed and phase can be determined by the injection control device 5 on the basis of the ignition current signal e extracted from the primary coil sides of the ignition coils 31 and 32 to thereby control the injection quantity and the injection timing of the aforementioned fuel injector.

Figure 3:
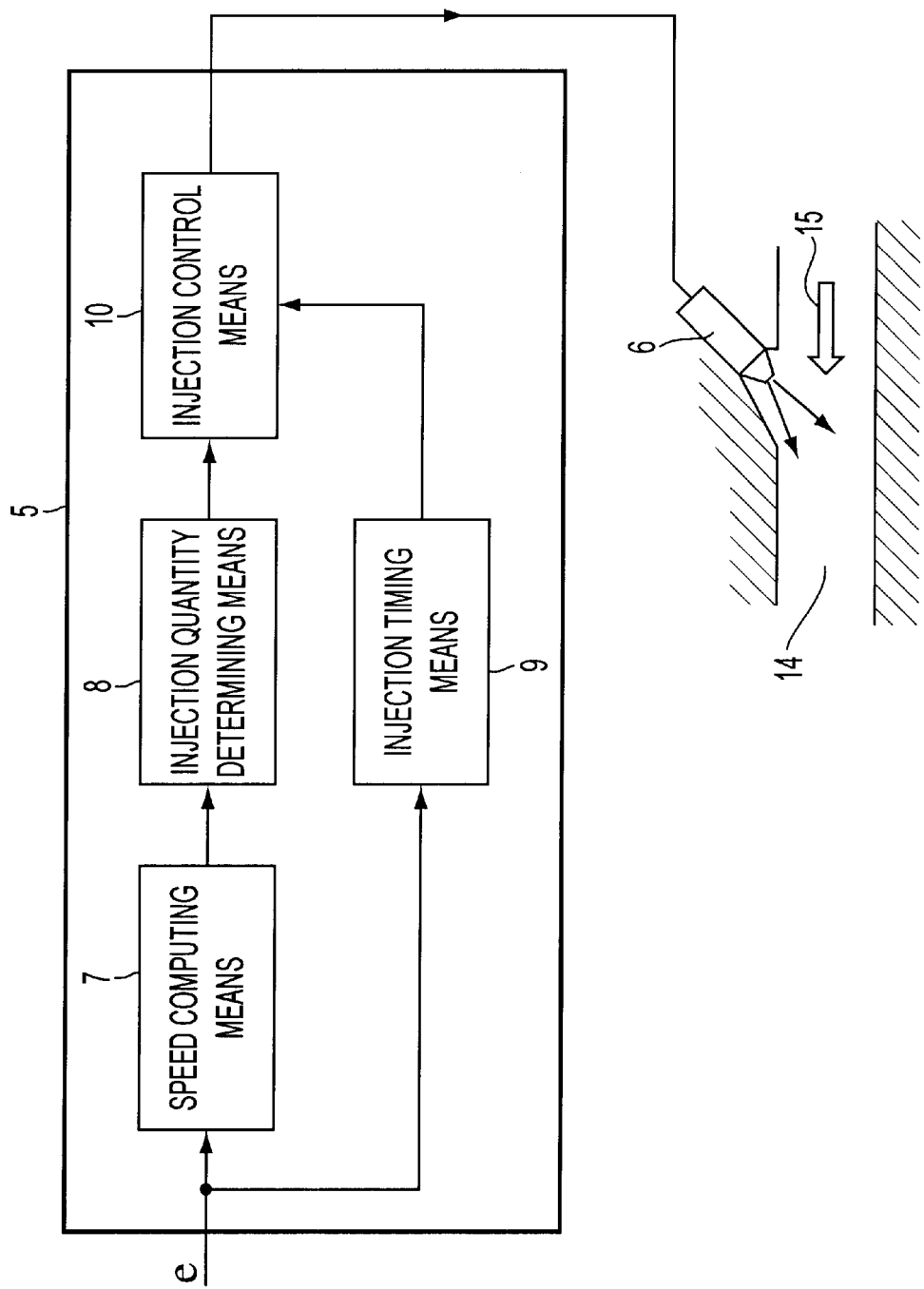
FIG. 3 is a block diagram of fuel control means added to the ignition coil in the engine.

As shown in FIG. 3, the injection control device 5 has a microcomputer for calculating the speed (the rotating speed) of the engine by speed computing means 7 in response to the ignition current signal e, and then determines the injection quantity of the fuel to be injected from the fuel injector 6 into the intake passage, by injection quantity determining means 8. Moreover, the phase can be discriminated from the ignition current signal e, which is also inputted to injection timing determining means 9 to determine the injection timing. This injection timing is inputted to injection control means 10 together with the injection quantity determining information from the injection quantity determining means 8. In accordance with this input information, the injection control means 10 feeds an electric current from a not-shown battery, at a predetermined timing and for a predetermined time period to the fuel injector 6, so that the fuel injector 6 is opened at the predetermined timing and for the predetermined time period to inject the fuel at the predetermined injection timing and in the injection quantity.

Figure 4:
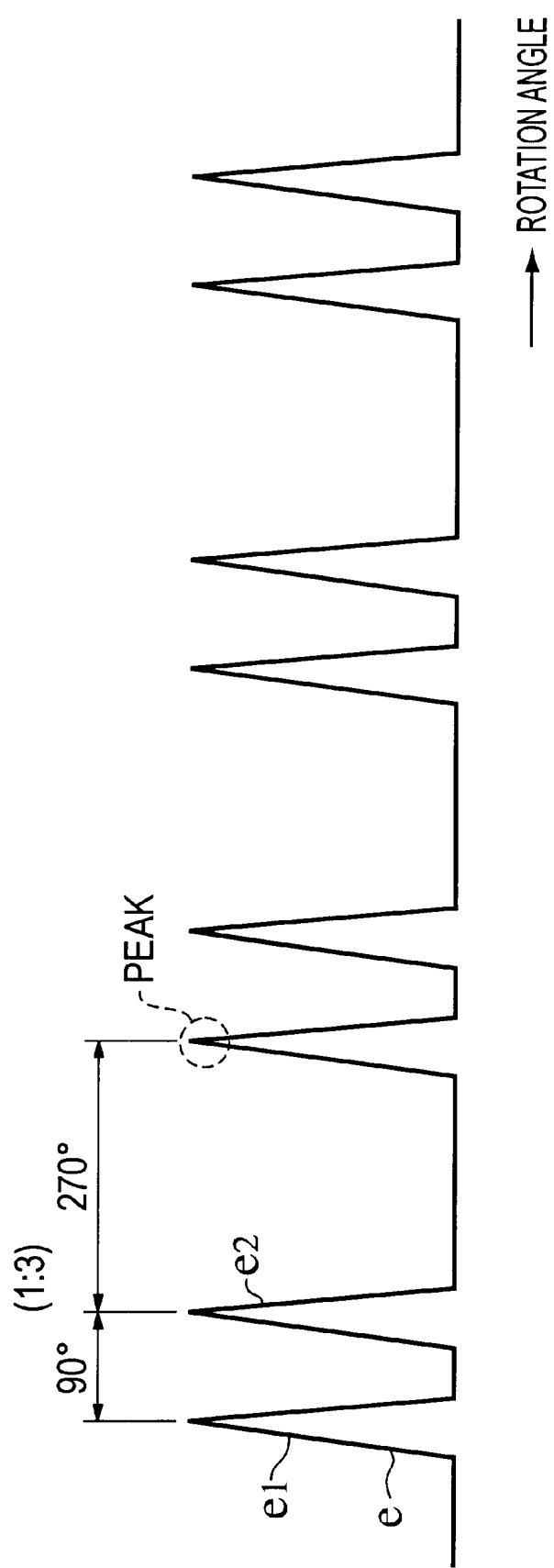
FIG. 4 is a graph showing a detected signal waveform in the engine.

The ignition current signal e has a signal waveform shown in FIG. 4. In the case of the V-type 2-cylinder engine, for example, the ignition coil 31 of the first cylinder 11 and the ignition coil 32 of the second cylinder 12 shown in FIG. 1 are arranged at the spacing of 90 degrees. During the one rotation of the flywheel 1 mounted on the crankshaft, therefore, the ignition current signal e of FIG. 4 is produced twice at an unequal angular spacing of 1:3. In other words, the peaks of the waveform by the ignition current signal e appear not at an equal spacing of 180 degrees, but at an unequal angular spacing (or an unequal pitch) of 90 degrees and 270 degrees so that the ignition current signals for the first cylinder and the second cylinder can be discriminated. For example, a proceeding signal e1 is employed in the fuel injection control for the first cylinder, and a signal e2 succeeding at a spacing of 90 degrees is employed in the fuel injection control for the second cylinder. Thus, it is possible to determine the injection timings easily for the individual cylinder.

For a simpler control, the injection timing may be determined for each cylinder with reference to one of the signals e1 and e2 or may be determined commonly for the individual cylinders. Moreover, the fuel can be injected at a predetermined timing with reference to the first signal detected, when the cylinder is not discriminated, such as at the starting time, and can be injected, after being discriminated, in the phase which has been determined in advance for each cylinder.

In the embodiment thus far described, in response to the ignition current signal e of FIG. 4 extracted from the primary sides of the ignition coils 31 and 32 of FIG. 1, the engine speed (or the rotating speed) and the phase are calculated by the injection control device 5 to control the injection quantity and the injection timing of the fuel injector. By connecting the injection control device 5 with the existing ignition coils 31 and 32, therefore, the fuel injection can be controlled while eliminating the pulsar coil and the rotary disc (such as the flywheel) having a number of protrusions, which might otherwise be needed in the prior art. It is, therefore, possible to reduce the number of parts and to lower the production cost. Moreover, the flywheel 1 with the magnet and the ignition coils 31 and 32 can be shared between the carburetor type engine and the fuel injection type engine to make the cost lower.

At the time of determining the fuel injection quantity, detected data of a pressure sensor, an intake temperature sensor and a water temperature sensor (not shown) may be all inputted to the Electronic Control Unit (the injection control device 5) and used as means for determining the injection quantity so that the optimum fuel injection quantity is determined.

While the foregoing embodiment has been exemplified for use with a V-type 2-cylinder engine, the present invention can also be likewise applied to other engines, such as a single-cylinder engine or an in-line type multiple cylinder engine.

Numerous modifications and alternative embodiments of the present invention will be apparent to those skilled in the art in view of the foregoing description. Accordingly, this description is to be construed as illustrative only, and is provided for the purpose of teaching those skilled in the art the best mode carrying out the invention. The detail of the structure and/or function may be varied substantially without departing from the spirit of the invention and all modifications which come within the scope of the appended claims are reserved.

What is claimed is:

1. A fuel injection engine comprising:
   a fuel injector for injecting a fuel into intake air;
   an ignition coil for activating an ignition plug by generating an ignition current synchronized with rotation of the engine; and
   an injection control device for controlling the injection quantity and the injection timing of the fuel injector;
   wherein the injection control device determines engine speed and phase by using an ignition current extracted from a primary coil side of the ignition coil to control the injection quantity and the injection timing of the fuel injector.

2. A fuel injection engine according to claim 1, wherein the engine is a V-type 2-cylinder engine, and two ignition coils are provided, one for each cylinder.

3. A fuel injection engine according to claim 1, wherein the injection control device includes a microcomputer.

4. A fuel injection engine according to claim 2, further comprising:

a flywheel mounted on a crankshaft; and a magnet disposed on a rotary face of the flywheel, wherein the ignition coils have a predetermined clearance from the magnet and are disposed to be circumferentially spaced by a predetermined angle on the engine.

5. A fuel injection engine according to claim 4, wherein the magnet is disposed on the outer circumference of the flywheel, the ignition coils include a core, the ignition coils are disposed radially beyond the flywheel, and the core has a predetermined clearance from the magnet.

6. A fuel injection engine according to claim 1, wherein the engine is a multiple cylinder engine with an ignition coil provided for each cylinder.

7. A fuel injection engine according to claim 6, wherein an ignition current signal from each ignition coil is discriminated by the injection control device.

8. A fuel injection engine according to claim 7, wherein an ignition current signal from one ignition coil associated with one cylinder controls injection quantity and injection timing for another cylinder.

9. A method for controlling fuel injection quantity and injection timing of a fuel injector in a fuel injection engine having at least one fuel injector for injecting a fuel into intake air, at least one ignition coil for actuating an ignition plug by generating an ignition current synchronized with rotation of the engine, and an injection control device, the method comprising:

extracting an ignition current from a primary side of the at least one ignition coil;

determining engine speed and phase from the extracted ignition current; and controlling a fuel injection quantity and fuel injection timing based on the determined engine speed and phase.

10. A method according to claim 9, wherein multiple ignition coils are provided, the method further comprising:

discriminating an ignition current signal from each of the plurality of ignition coils.

11. A method according to claim 10, further comprising:

using the discriminated ignition current signal from one ignition coil associated with one engine cylinder to control the fuel injection quantity and fuel injection timing of a fuel injector for another engine cylinder.

* * * * *